US007513546B2

(12) United States Patent
Vranish

(10) Patent No.: US 7,513,546 B2
(45) Date of Patent: Apr. 7, 2009

(54) CONFORMAL GRIPPING DEVICE

(75) Inventor: John M. Vranish, Crofton, MD (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 91 days.

(21) Appl. No.: 11/689,161

(22) Filed: Mar. 21, 2007

(65) Prior Publication Data

US 2008/0232946 A1 Sep. 25, 2008

(51) Int. Cl.
*B25J 15/00* (2006.01)
(52) U.S. Cl. ........................ 294/86.4; 294/902; 269/266
(58) Field of Classification Search ................ 294/86.4, 294/119.1, 902, 1.1; 269/266; 901/36, 39
See application file for complete search history.

(56) References Cited

U.S. PATENT DOCUMENTS 2,486,494 A * 11/1949 Rice ............................ 269/266
2,754,708 A * 7/1956 Peterson ...................... 269/224
4,047,709 A * 9/1977 Thyberg et al. ............... 269/22
4,572,564 A * 2/1986 Cipolla ......................... 294/88
4,752,063 A * 6/1988 Nagy .......................... 269/266
5,403,057 A * 4/1995 Sugito et al. ............. 294/119.1

\* cited by examiner

*Primary Examiner*—Dean J Kramer
(74) *Attorney, Agent, or Firm*—Matthew Johnston

(57) ABSTRACT

The present invention relates to a conformal gripping device. In an embodiment of the present invention a conformal gripper device may be disclosed comprising a frame that includes an array of movable pins. The device may also include a roller locking and unlocking system within the frame. The system may comprise a pair of locking rollers for each row of gripper pins to facilitate locking and unlocking the array of gripper pins on a column-by-column basis. The system may also include a striker element that may force the locking rollers to roll along an angled roll surface to facilitate unlocking of the array of pins on a column-by-column basis. The system may further include an electromagnetic actuator or solenoid and permanent magnets to facilitate movement of the striker element and the locking rollers.

24 Claims, 5 Drawing Sheets

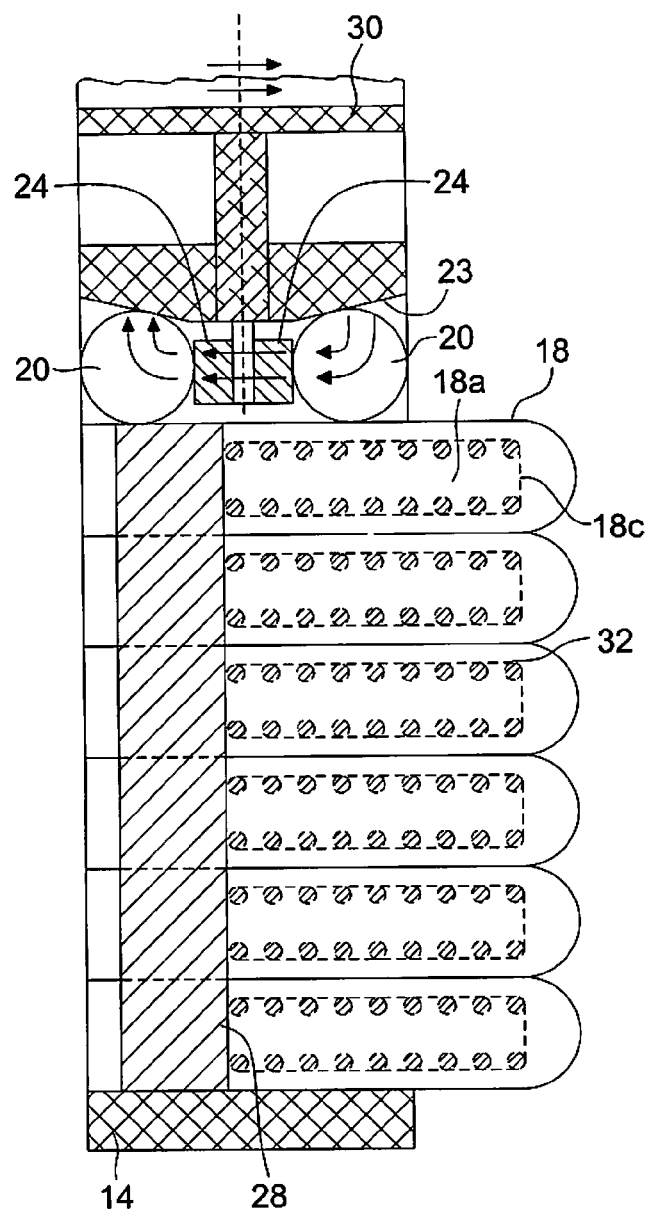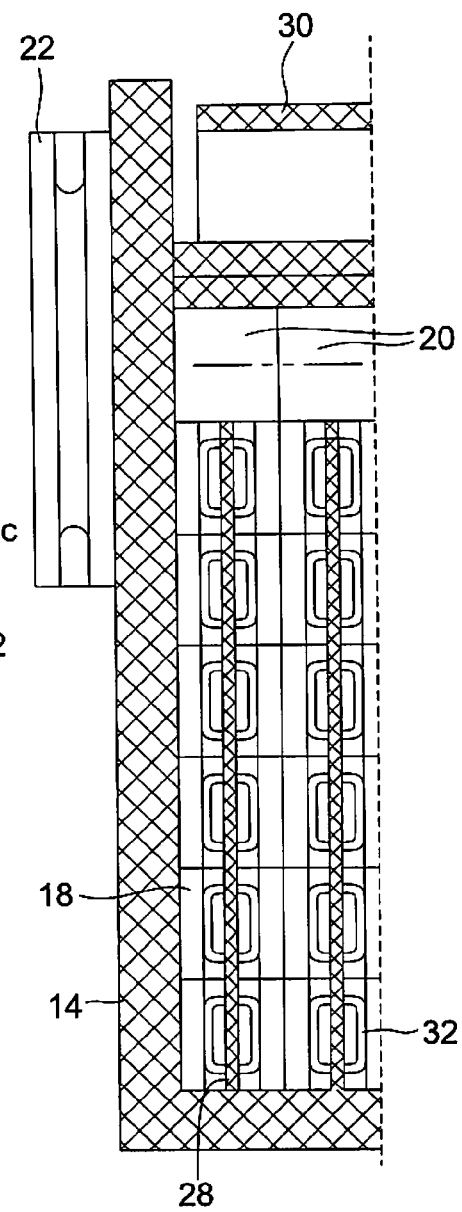
FIG. 3A
FIG. 3B

CONFORMAL GRIPPING DEVICE

ORIGIN OF THE INVENTION

The invention described herein was made by employees of the United States Government, and may be manufactured and used by or for the Government for governmental purposes without the payment of any royalties thereon or therefor.

CROSS REFERENCE TO RELATED PATENTS

The present invention is related to an invention shown and described in U.S. Pat. No. 6,626,792, entitled, "GEAR BEARINGS", filed on Mar. 3, 2001

The above-noted related patent is assigned to the assignee of the present invention. The related patent is herein incorporated by reference in its entirety.

FIELD OF THE INVENTION

The invention disclosed herein generally relates to a gripping device typically used in tooling operations. More particularly, the invention provides a device, system and method for grasping, gripping and clamping an object.

BACKGROUND OF THE INVENTION

It has been known in many R&D and manufacturing applications to utilize a clamp to hold a work piece in place while various tasks are performed on the work piece. It has also been known to utilize a robotic end-effector to pick up or grasp an object for R&D and manufacturing applications. For such applications, a typical system may consist of a robot or robotic arm, a change-out device secured to the robot arm and an end-effector releasably attached to the change-out device. The change-out device may typically be designed to accommodate different end-effectors for grasping or manipulating various work-pieces.

In many manufacturing applications employing gripping devices, the cost, size and complexity of the gripper may make its use undesirable. Where large machining operations are performed, specific fixtures typically are used to facilitate the machining and handling of specific work pieces. This may get costly as the number and type of work-piece needing to be machined or handled is increased. To achieve maximum productivity and efficiency, fixtures are custom made for the work-pieces. Such customization may speed production but will increase cost. Advances in manufacturing technology such as determinant assembly entail stabilizing a work-piece on a support fixture. Determinant assembly is a method of self-indexing of detail parts to each other to create an assembly. By using determinant assembly, parts can be assembled with a minimum number of tools. However, the tooling and machinery that are used to accomplish determinant assembly have been complex and capital intensive.

Thus, in the mass production and R&D industries, there may be a need for a gripper device to have the capability of grasping and securing several different types/shapes of workpieces during a single manufacturing process. It may be desirable for a gripper device to be able to conform to the shape of any work-piece to be grasped or securely held. During work or manipulation of the work piece, external forces may be applied to the work-piece. The gripper may be capable of supplying sufficient force to keep the work-piece secure while work is performed on the work-piece.

It has been desirable to provide a gripping device that may be capable of conforming to the shape of any work-piece to be grasped or held in place despite external forces that may be impacted upon the work-piece. It has also been desirable to provide a gripping device and system that may be compact and capable of conforming to any work-piece while providing the necessary strength and stability to facilitate R&D and manufacturing processing.

Accordingly, it may be desirable to provide a conformal gripping device, system and method that may be sufficiently useful, compact and low cost to be widely used in any R&D or manufacturing environment.

SUMMARY OF THE INVENTION

In one embodiment a conformal gripping device may be disclosed comprising a frame that includes an array of movable pins, a plurality of locking rollers positioned within the frame for roller locking the array of movable pins on a column-by-column basis and a striker element for forcing the locking rollers to roll along an angled roll surface to facilitate an unlocking position for the array of movable pins.

In another embodiment a conformal gripper system may be disclosed comprising a frame that includes an array of movable pins and a roller locking system within the frame, wherein the system comprises a pair of locking rollers for each row of gripper pins to facilitate locking the array of gripper pins on a column by column basis. The system may include a striker element that forces the locking rollers to roll along an angled roll surface to facilitate unlocking of the array of pins on a column-by-column basis. The system may further include an electromagnetic element or solenoid and permanent magnets to facilitate actuation of the striker element and the locking rollers.

In yet another embodiment a method of using a conformal gripping device may be disclosed wherein the method may include providing a frame that includes an array of movable pins; providing a roller locking system within the frame wherein the system comprises a pair of locking rollers for each row of gripper pins to facilitate locking the array of gripper pins on a column-by-column basis; providing a striker element to facilitate roller locking and unlocking of the array of gripper pins on a column by column basis; and, providing a striker element to force the locking rollers into rolling engagement with an angled roll surface to unlock the array of gripper pins on a column-by-column basis.

In still another embodiment, a conformal gripping device may be disclosed wherein the device comprises a frame that includes an array of gripper pins and a roller locking and unlocking system that is designed such that the striker elements are located external to the frame. The external location of the striker element may represent an alternate arrangement for the roller locking and unlocking system.

BRIEF DESCRIPTION OF THE DRAWINGS

The accompanying drawings illustrate embodiments of the invention and together with the description, serve to explain the principles of the invention.

FIG. 3A shows a cross sectional view of the device shown in FIG. 2.

FIG. 3B shows a partial cross sectional view of the device shown in FIG. 3A.

DETAILED DESCRIPTION

In the following detailed description, reference is made to the accompanying drawings that form a part hereof, and in which are shown, by way of illustration, specific embodiments, which may be practiced. These embodiments are described in sufficient detail to enable those skilled in the art to practice the embodiments. Those skilled in the art will readily understand that other embodiments may be utilized, and that logical, mechanical, electrical and other changes may be made, without departing from the scope of the embodiments. Ranges of parameter values described herein are understood to include all sub-ranges falling therewithin. The following detailed description may, therefore, not to be taken in a limiting sense but as illustrative of the embodiments of the present invention.

Figure 1:
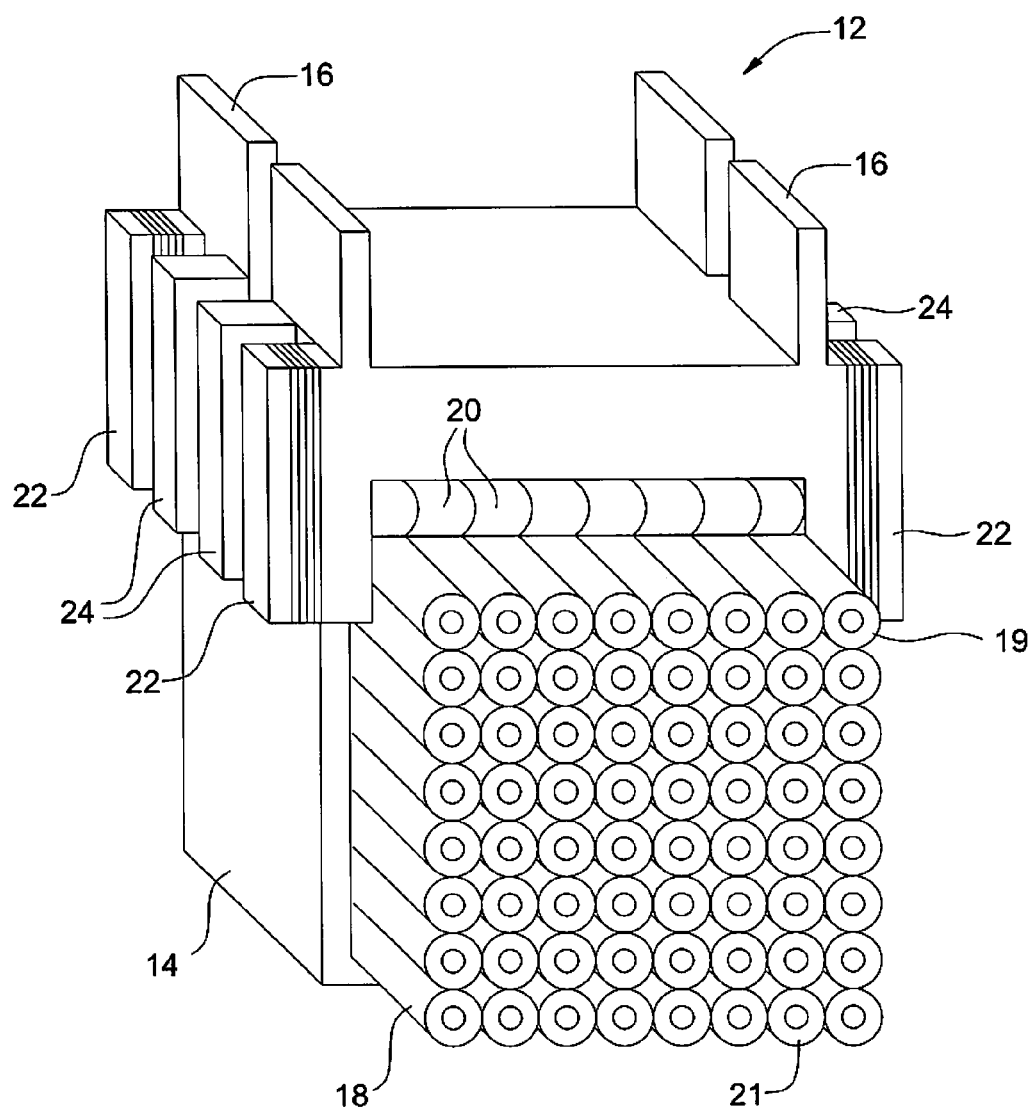
FIG. 1 shows a conformal gripping device according to an embodiment of the present invention.

In FIG. 1 an embodiment of the present invention, a conformal gripping device may be disclosed wherein the device may comprise two identical jaws 12 (one jaw is shown). Jaws 12 may be actuated to reciprocate in an opening closing fashion by conventional means. Each jaw may comprise a frame housing 14, which may be constructed with any suitable metal or plastic or any combination thereof. Frame housing 14 may be designed to function as an end-effector connected to a robotic arm (not shown) to facilitate manipulation of the jaws 12. Thus, frame housing 14 may include coupling elements 16 to facilitate coupling with a robotic arm (not shown). Within frame housing 14 an array of gripping pins 18 may be located in a column and row matrix fashion. The size of the matrix of gripper pins 18 may be governed by the particular application of the conformal gripper device 10. Locking rollers 20 may be located along a top row 19 of gripper pins 18. Each locking roller 20 may interact with each gripper pin 18 of top row 19 of gripper pins 18. Locking rollers 20 may be a Gear Bearing type roller disclosed in U.S. Pat. No. 6,626,792. Locking rollers 20 may roll lock gripper pins 18 by compressing the pins in a column-by-column fashion. A pair of locking rollers 20 may lock each column 21 of gripper pins 18. Frame housing 14 also includes solenoid elements 22 and striker elements 24 located at the top exterior of the housing. There may be two pair of solenoid elements 22 formed on frame housing 14. A first pair may be located in the front or forward portion of the housing and a second pair may be formed in a back portion of frame housing 14. The location of solenoid elements 22 may vary as need or design choice dictates. Frame housing 14 may be designed to compactly contain gripping pins 18 and locking rollers 20 so as to provide a conformal gripping device that is compact.

Figure 2:
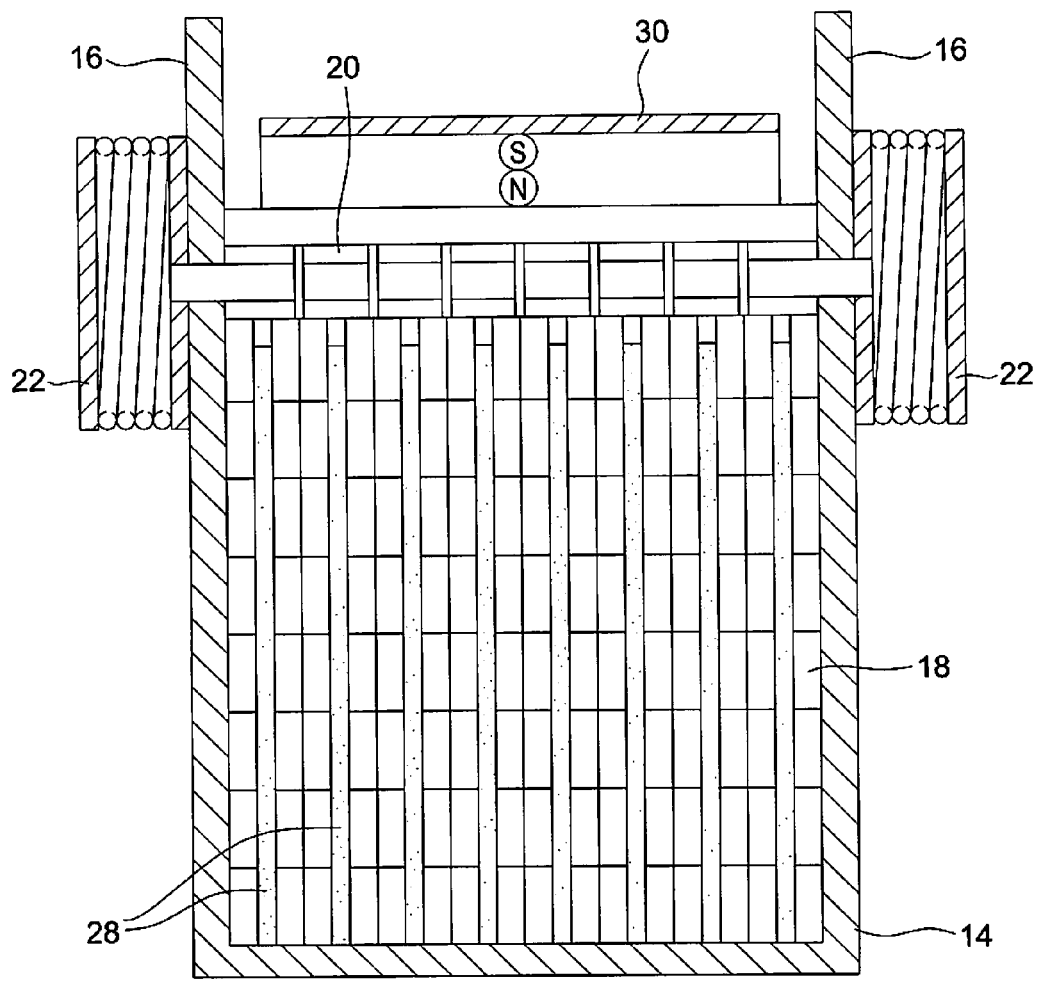
FIG. 2 shows a cross sectional view of the device shown in FIG. 1.

FIG. 2 discloses a cross sectional view of the embodiment shown in FIG. 1. Gripper pin guides 28 may be integrally formed with frame housing 14 to provide a rigid guide for gripper pins 18. Gripper pin guides 28 may be formed in parallel fashion to facilitate the accurate alignment of columns 21 which collectively form a matrix or gripper pins 18. The spacing between gripper guide pins 28 may be governed by the size of the gripper pins 18 desired for a particular application. Gripper pin guides 28 may be located in a back portion of frame housing 14 and may be shaped so as to facilitate ease of guiding and positioning gripper pins 18. Solenoid elements 22 and permanent magnet 30 may facilitate the movement of striker element 24. Permanent magnet 30 may be positioned within frame housing 14 and above locking rollers 20, with opposite (+/−) magnetic poles facing adjacent locking rollers 20. This configuration may facilitate an electromagnetic actuator arrangement. In this arrangement, a single electromagnetic actuator may be used to unlock or lock a single row 19 of locking rollers 20. Each locking roller 20 in turn may lock or unlock a single column of gripper pins 18. Further, this electromagnetic actuator arrangement may be positioned such that the arrangement may be out of the way of gripper pins 18, thereby facilitating an overall compact conformal gripping arrangement. Thus, the positioning of the electromagnetic actuator arrangement may be dictated by need or design choice.

FIG. 3A discloses a cross sectional view of the embodiment shown in FIG. 2. Gripper pins 18 may be formed with a hollow center portion 18a for receiving gripper pin guide 28. Hollow portion 18a may also receive preload spring 32. Preload spring 32 may bias gripper pins 18 while in the unlocked position. Gripper pins 18 may be biased in the extended position. Preload spring 32 may abut gripper pin guide 28 and a terminal portion 18c of gripper pin 18. Gripper pins 18 may be arranged such that no air gaps exist between pins, which are vertically stacked forming column 21. At one end of column 21, gripper pins 18 may abut a bottom portion of frame housing 14, and at the other end gripper pins 18 may abut a pair of locking rollers 20. Each column 21 may have a pair of locking rollers interacting with a gripper pin 18. Locking rollers 20 also interact with striker element 24 and angled roll surface 23. When locking rollers 20 roll along angled roll surface 23, gripper pins 18 in column 21 may be locked or unlocked. When locking rollers 20 move towards each other, gripper pins 18 of column 21 may be locked. When locking rollers 20 move away from each other, gripper pins 18 may be unlocked. As locking rollers 20 move towards each other, the angled roll surface 23 may cause locking rollers 20 to wedge between the angled roll surface 23 and gripper pins 18. This wedging action may cause gripper pins 18 in column 21 to be in compression with each other. This compression force may cause gripper pins 18 of column 21 to be in the locked position. When the compression force is removed as a result of locking rollers 20 moving in the opposite direction, gripper pins 18 may be in the unlocked position.

FIG. 3B discloses a side sectional view of the embodiment of FIG. 3A. Gripper guide pins 28 may be laterally spaced such that adjacent gripper pins 18 in rows 19 are touching. Preload spring 32 positioned within space 18a of gripper pins 18 may abut gripper pin guide 28 but does not exert any pressure on gripper pin guide 28 while gripper pins 18 are in the unlocked position. Pressure may be exerted on gripper pin guide 28 when preload spring 32 is compressed as a result of gripper pins 18 contact with an object or workpiece (not shown). However, this pressure may be minimal and may result in little or no movement of the rigidly attached gripper pin guide 28.

Figure 4:
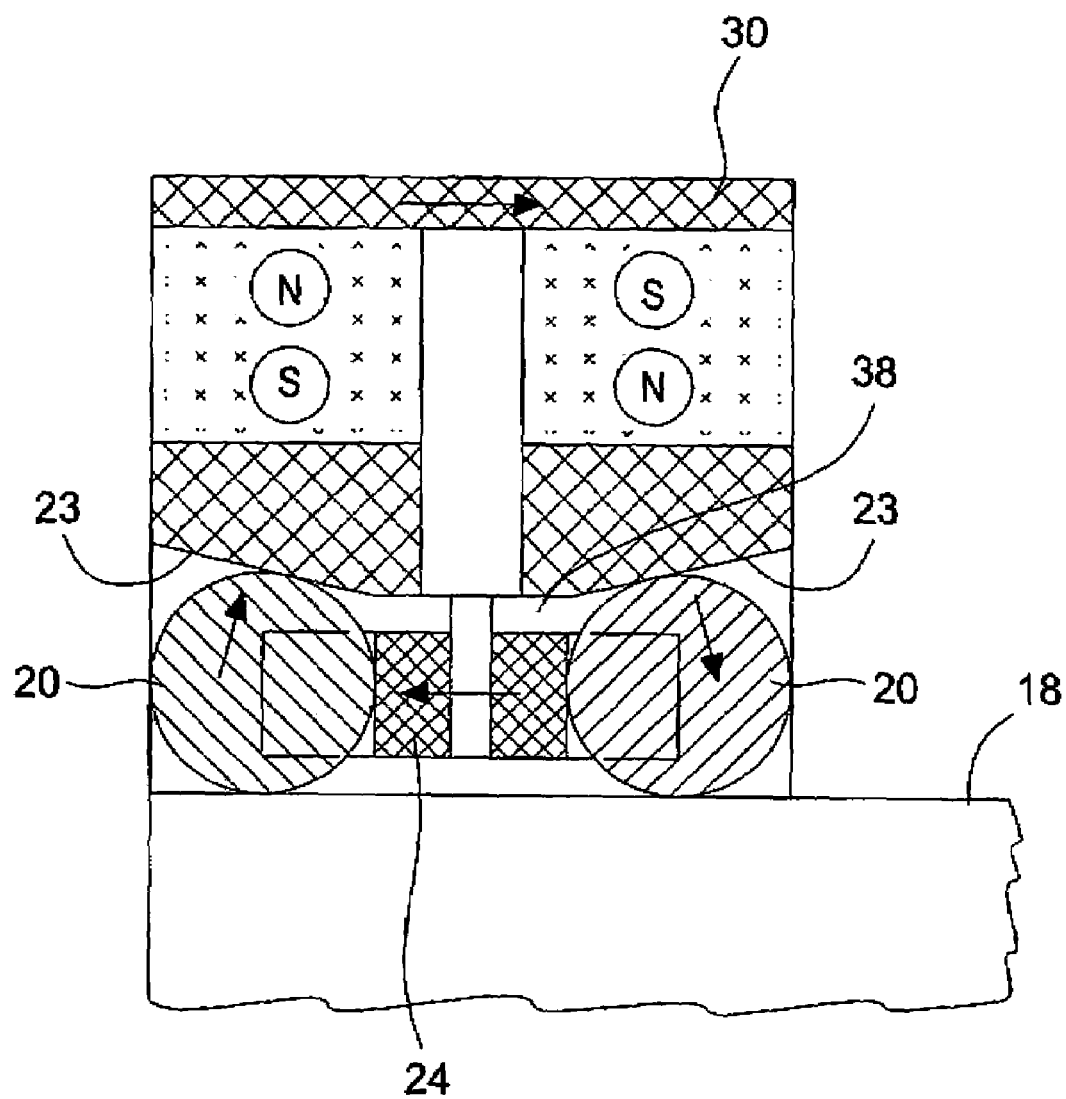
FIG. 4 shows a detailed view of the locking rollers, permanent magnets and striker element of the device shown in FIG. 3A.

FIG. 4 discloses a detailed cross sectional view of the locking rollers 20 and its interaction with angled roll surface 23 and striker elements 24 according to an embodiment of the present invention. Roller locking and unlocking may be performed on a column-by-column basis. In this instance, gripper pins 18 may represent the column 21. Each column of gripper pins 18 may be terminated on one extreme by a pair of locking rollers 20 at top portion of the column and the frame housing 14 at the bottom portion of the column. Locking rollers 20 may be preloaded via a preload spring (not shown) so as to bias the rollers in the unlocked position. The act of preloading may also serve to push gripper pins 18 against each other, thereby removing any rattle or gaps between gripper pins 18. Each column 21 may normally be locked against motion. Two strikers 24 may be employed, each with its own electromagnetic actuation or solenoid elements 22. Strikers 24 may travel along a striker guide way 38 which may be formed within a side of frame housing 14. Two striker guide ways 38 may be formed on opposites sides of frame housing 14. Thus, locking rollers 20 may independently lock and unlock gripper pins 18 in column 21. There may be two locking rollers per column 21 to provide locking and unlocking in both the front and rear portions of gripper pins 18. To facilitate the conformal shaping to and object or workpiece, both forward and rear locking rollers 20 may be actuated. Strikers 24 actuate locking roller 20 to move along angled roll surface 23. Activating their respective solenoid element 22 may actuate striker elements 24. When striker elements 24 are actuated they may be moved in opposite directions, which in turn may force locking rollers 20 to move along angled roll surface 23 such that gripper pins 18 in column 21 may be in the unlocked position. Thus, gripper pins 18 may now be free to conform to any shape of an object or workpiece. Preload spring 32 may allow gripper pins 18 to conform to an object or workpiece with minimum force exerted on the object or workpiece. The configuration of gripper pins 18 can now be locked in place by re-engaging the locking rollers 20. This may be achieved by deactivating the solenoid elements 22 for each of the striker elements 24. With the solenoid elements 22 deactivated, permanent magnet 30 may force locking rollers 20 in the reverse direction along angled roll surface 23. Thus, locking rollers 20 may now be move towards each other between angled roll surface 23 and gripper pins 18 of column 21. Locking rollers 20 may now be wedged between angled roll surface 23 and gripper pins 18 of column 21, thereby locking gripper pins 18 of column 21 in place. This action may be performed simultaneously for each column 21, thus facilitating a conformal gripping of an object or work piece.

Figure 5:
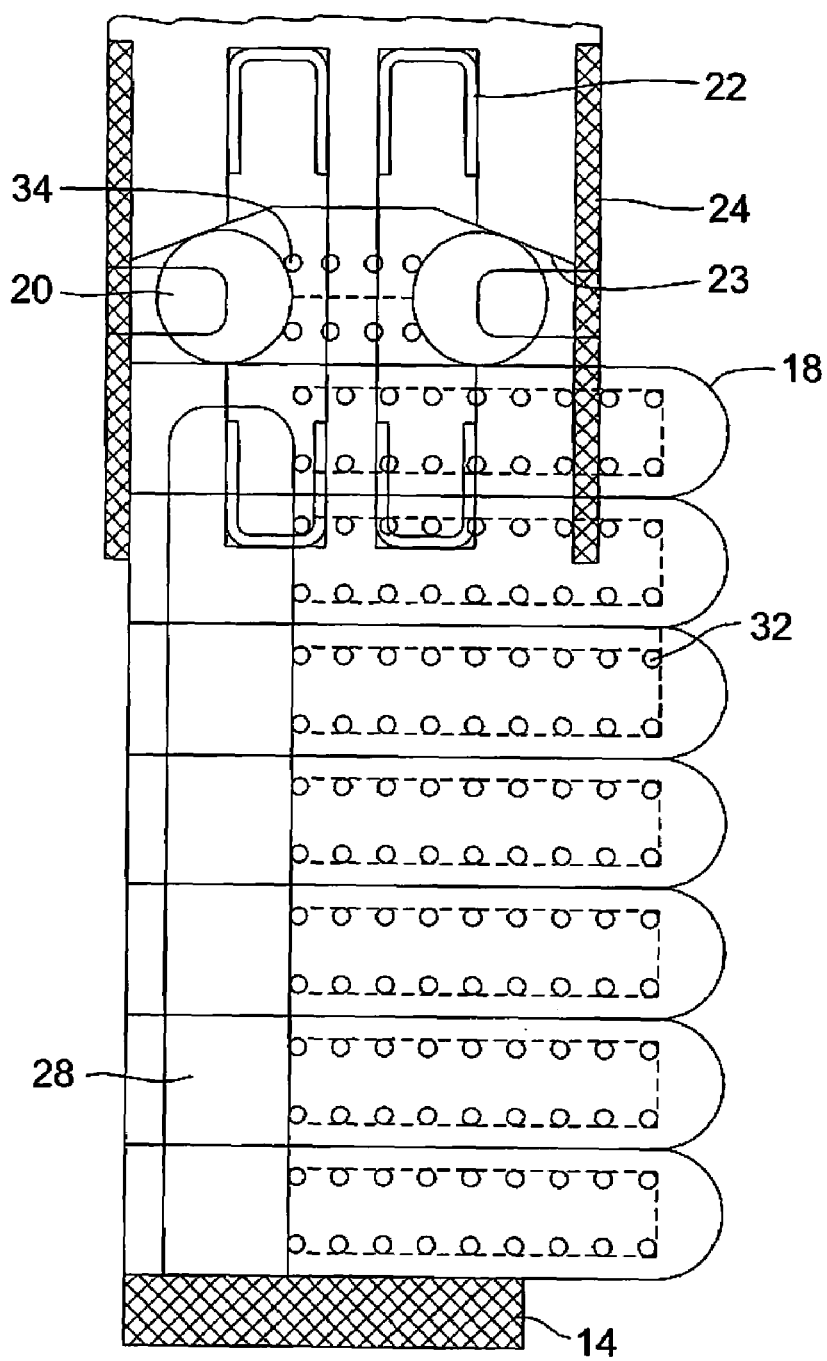
FIG. 5 shows an alternate embodiment of the present invention.

In FIG. 5. an alternate embodiment of the invention is shown wherein a conformal gripper device may be disclosed with striker elements 24 located external to the housing frame 14 as opposed within frame housing 14. In this embodiment, the angled roll surfaces 23 are sloped in the opposite direction and solenoid elements 22 are located between striker elements 24. A preload spring 34 for locking rollers 20 may be located between the rollers, thus biasing locking rollers 20 in opposite directions to prevent any rattle and eliminate any gaps between pins 18 of column 21. The operation of this embodiment may be the same as that of the embodiment presented in FIGS. 1 through 4.

In operation, a conformal gripper positions jaws 12 to grasp an object or workpiece by closing jaws 12. Gripper pins 18 are then unlocked on a column-by-column basis. Upon contact with the surface of and object or work piece (not shown), gripper pins 18 are pushed to a rear portion of frame housing 14. The cumulative effect of this action is the creation of a soft, piecewise conformal configuration of gripper pins 18 to the surface of the object or workpiece. Gripper pins 18 may now be locked thereby locking the configuration of the shape formed by gripper pins 18. The object or workpiece may now be gently but firmly captured and secured. Upon completion of any manipulation or work on the object or workpiece, jaws 12 may be opened and the object or workpiece is released.

Although a few embodiments of the present invention have been shown and described, it may be appreciated by those skilled in the art that changes may be made in these embodiments without departing from the principles and spirit of the invention. Other embodiments of the invention may be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for gripping wherein said device comprises:
   a frame comprising an array of movable pins arranged in a plurality of rows and columns;
   a plurality of locking rollers positioned within said frame for locking said array of movable pins; and,
   a striker element moveable to selectively force one of said plurality of locking rollers to engage a corresponding movable pin of at least one of said columns of moveable pins thereby locking said at least one of said columns of moveable pins in a locked position.

2. A device according to claim 1, wherein said plurality of locking rollers engages an entire one of said plurality of said rows thereby locking said array of moveable pins in a locked position.

3. A device according to claim 1, wherein each pin in said array of movable pins is preloaded biased in an extended position.

4. A device according to claim 1, wherein each column of said array of movable pins discretely engages said locking rollers to thereby facilitate unlocking said column of moveable pins.

5. A device according to claim 1, wherein each column of said array of movable pins discretely engages said locking rollers to thereby facilitate locking said column of moveable pins.

6. A device according to claim 1, wherein said locking rollers and said striker element are located within said frame.

7. A device according to claim 1, wherein said striker element is located external to said frame.

8. A device according to claim 7 wherein each of said pins in said array of movable pins is adapted to reciprocate between an unlocked position and a locked position.

9. The device according to claim 1, wherein a pair of permanent magnets facilitates movement of said striker element.

10. The device according to claim 1, wherein a pair of solenoids facilitates movement of said striker element.

11. A device for gripping wherein said device comprises:
    a frame comprising an array of movable pins;
    a plurality of locking rollers positioned within said frame for locking said array of movable pins; and,
    a striker element forcing said locking rollers into an unlocking position; wherein a pair of permanent magnets facilitates movement of said striker element.

12. A device for gripping wherein said device comprises:
    a frame comprising an array of movable pins;
    a plurality of locking rollers positioned within said frame for locking said array of movable pins; and,
    a striker element forcing said locking rollers into an unlocking position; wherein a pair of solenoids facilitates movement of said striker element.

13. A system for gripping wherein said system comprises:
    a frame comprising an array of movable pins arranged in a plurality of rows and columns;
    a roller locking system comprising a pair of locking rollers arranged to engage corresponding angled roll surfaces; and
    a striker element moveable to selectively force said locking rollers into rolling engagement with said angled roll surfaces and wedge between said striker element and a corresponding movable pin of at least one of said columns of moveable pins to thereby lock said array of movable pins.

14. A system according to claim 13, wherein each pair of said locking rollers engages a column of pins in said array of movable pins.

15. A system according to claim 14, wherein each column of said array of movable pins discretely engages said locking rollers to thereby facilitate unlocking said column of moveable pins.

16. A system according to claim 14, wherein each column of said array of movable pins discretely engages said locking rollers to thereby facilitate locking said column of moveable pins.

17. A system according to claim 13, wherein said array of movable pins are preloaded biased in an extended position.

18. The system of claim 13, wherein said roller locking system is completely located within said frame.

19. The system of claim 13, wherein said striker element is located external to said frame.

20. The system of claim 19, wherein each of said pins in said array of movable pins is adapted to reciprocate between an unlocked position and a locked position.

21. The device according to claim 13, wherein a pair of permanent magnets facilitates movement of said striker element.

22. The device according to claim 13, wherein a pair of solenoids facilitates movement of said striker element.

23. A system for gripping wherein said system comprises:
a frame comprising an array of movable pins;
a roller locking system within said frame comprising a pair of locking rollers with corresponding angled roll surfaces; and
a striker element forcing said locking rollers into rolling engagement with said angled roll surfaces to lock said array of movable pins; wherein a pair of permanent magnets facilitates the rolling engagement of said locking rollers with said angled roll surfaces.

24. A system for gripping wherein said system comprises:
a frame comprising an array of movable pins;
a roller locking system within said frame comprising a pair of locking rollers with corresponding angled roll surfaces; and
a striker element forcing said locking rollers into rolling engagement with said angled roll surfaces to lock said array of movable pins; wherein a pair of solenoid elements facilitates rolling engagement of said locking rollers with said angled roll surface.

* * * * *